(12) United States Patent
Shuster et al.

(10) Patent No.: US 12,210,533 B2
(45) Date of Patent: Jan. 28, 2025

(54) CONFIGURABLE MONITORING AND ALERTING SYSTEM

(71) Applicant: Red Hat, Inc., Raleigh, NC (US)

(72) Inventors: Boaz Shuster, Ra'anana (IL); Oded Ramraz, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 79 days.

(21) Appl. No.: 17/176,507

(22) Filed: Feb. 16, 2021

(65) Prior Publication Data
US 2022/0261405 A1    Aug. 18, 2022

(51) Int. Cl.
*G06F 16/2457* (2019.01)
*G06Q 10/0637* (2023.01)

(52) U.S. Cl.
CPC ... *G06F 16/24573* (2019.01); *G06Q 10/0637* (2013.01)

(58) Field of Classification Search
CPC .......... G06F 16/24573; G06Q 10/0637; G06Q 10/06
See application file for complete search history.

(56) References Cited

U.S. PATENT DOCUMENTS

| | | | |
|---|---|---|---|
| 7,940,756 B1 * | 5/2011 | Duffy | H04L 47/2475 709/225 |
| 9,361,354 B1 * | 6/2016 | Bell | G06F 16/16 |
| 9,612,815 B1 | 4/2017 | Jagtap et al. | |
| 9,612,821 B2 | 4/2017 | Iyer et al. | |
| 10,404,547 B2 | 9/2019 | Bartfai-Walcott et al. | |
| 10,831,638 B2 | 11/2020 | Marascu et al. | |
| 2006/0188011 A1 * | 8/2006 | Goldszmidt | G06Q 10/04 375/229 |

(Continued)

OTHER PUBLICATIONS

"Set proactive alerting: understand and respond to performance issues", Contents/Solutions and best practices/New Relic solutions/Measure DevOps success; https://docs.newrelic.com/docs/new-relic-solutions/new-relic-solutions/measure-devops-success/set-proactive-alerting-understand-respond-performance-issues; 8 pages; retrieved on or before Dec. 7, 2020.

(Continued)

*Primary Examiner* — Brittany N Allen
*Assistant Examiner* — William P Bartlett
(74) *Attorney, Agent, or Firm* — Kilpatrick Townsend & Stockton LLP

(57) ABSTRACT

A system, include a memory and a processor where the processor is in communication with the memory. The processor is configured to receive a request to analyze an infrastructure comprising a first set of components. Keywords associated with the infrastructure are retrieved and a database is queried, where the database comprises implementations of infrastructures, to retrieve a second set of components associated with the keywords. The processor is configured to determine whether the second set of service level objectives corresponds to the first set of service level objectives. Extra service level indicators are added from the second set of service level indicators to the first set of service level indicators to create a third set of service level indicators. The third set of service level indicators are monitored during operation of the infrastructure to determine whether the first set of service level objectives are met.

15 Claims, 4 Drawing Sheets

(56) References Cited

U.S. PATENT DOCUMENTS

| | | | | |
|---|---|---|---|---|
| 2007/0294672 | A1* | 12/2007 | Mosuoka | G06Q 10/06 |
| | | | | 717/126 |
| 2010/0091671 | A1* | 4/2010 | Lidstrom | H04L 41/5003 |
| | | | | 370/252 |
| 2017/0031600 | A1* | 2/2017 | Kesavan | G06F 3/0605 |
| 2018/0285571 | A1* | 10/2018 | Hanner | G06F 8/71 |
| 2018/0373617 | A1 | 12/2018 | Gaier et al. | |
| 2020/0241872 | A1 | 7/2020 | Muddakkagari | |

OTHER PUBLICATIONS

"Alerting on your burn rate", https://cloud.google.com/stackdriver/docs/solutions/slo-monitoring/alerting-on-budget-burn-rate; Nov. 16, 2020; 4 pages; retreived on or before Dec. 7, 2020.

* cited by examiner

CONFIGURABLE MONITORING AND ALERTING SYSTEM

BACKGROUND

Computer systems may run applications or services that are provided via a server or cloud. The applications or services can be developed and deployed at runtime. Application instances or services may run within containers, which may be run on physical or virtual machines. The containers may be used to separate various components of a computing system. For example, different components of a computing system may be executed at different containers and/or virtual machines executing on a computing device or multiple computing devices. Maintenance and/or modifications to installed service and/or applications may often be applied in various server or cloud environments which may be continuously evolving.

SUMMARY

The present disclosure provides new and innovative systems and methods for providing a configurable monitoring and alerting system. In an example, a method includes receiving a request to analyze an infrastructure comprising a first set of components, where the request includes a first set of service level indicators associated with the first set of components and a first set of service level objectives associated with the infrastructure. Keywords associated with the infrastructure are retrieved and a database, which comprises implementations of infrastructures, is queried to retrieve a second set of components associated with the keywords. Each implementation is comprised of one or more components, where the second set of components are associated with a second set of service level indicators and a second set of service level objectives. The method includes determining whether the second set of service level objectives corresponds to the first set of service level objectives. Upon determining that the second set of service level objectives corresponds to the first set of service level objectives, extra service level indicators from the second set of service level indicators are added to the first set of service level indicators to create a third set of service level indicators. During operation of the infrastructure, the third set of service level indicators are monitored to determine whether the first set of service level objectives are met.

In an example, a system includes a memory and a processor where the processor is in communication with the memory. The processor is configured to receive a request to analyze an infrastructure comprising a first set of components, where the request includes a first set of service level indicators associated with the first set of components and a first set of service level objectives associated with the infrastructure. Keywords associated with the infrastructure are retrieved and a database is queried, where the database comprises implementations of infrastructures, to retrieve a second set of components associated with the keywords. Each implementation is comprised of one or more components, where the second set of components are associated with a second set of service level indicators and a second set of service level objectives. The processor is configured to determine whether the second set of service level objectives corresponds to the first set of service level objectives. Upon determining that the second set of service level objectives corresponds to the first set of service level objectives, extra service level indicators are added from the second set of service level indicators to the first set of service level indicators to create a third set of service level indicators. The third set of service level indicators are monitored during operation of the infrastructure to determine whether the first set of service level objectives are met.

In an example, a non-transitory machine readable medium storing code, which when executed by a processor is configured to receive a request to analyze an infrastructure comprising a first set of components, where the request includes a first set of service level indicators associated with the first set of components and a first set of service level objectives associated with the infrastructure. Keywords associated with the infrastructure are retrieve and a database, which comprises implementations of infrastructures, is queried to retrieve a second set of components associated with the keywords. Each implementation is comprised of one or more components, where the second set of components are associated with a second set of service level indicators and a second set of service level objectives. The processor is configured to determine whether the second set of service level objectives corresponds to the first set of service level objectives. Upon determining that the second set of service level objectives corresponds to the first set of service level objectives, extra service level indicators from the second set of service level indicators are added to the first set of service level indicators to create a third set of service level indicators. During operation of the infrastructure, the third set of service level indicators are monitored to determine whether the first set of service level objectives are met.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION

Techniques are disclosed for providing an ability to analyze, monitor, and/or modify system infrastructure based on desired service level objectives. Typically, rapid development methodologies (e.g., DevOps) require an ability to rapidly deploy complex infrastructures (e.g., physical and virtual resources including, but not limited to, hardware, software, network resources, and associated services) quickly and efficiently. However, generally, rapid deployment does not necessarily mean that a complex infrastructure is optimally configured or provides optimal performance. Often, complex infrastructures have performance issues associated with a complexity of including many components and/or tools orchestrated and/or working together in a given configuration of the infrastructure. Conventionally, performance of complex infrastructures is difficult to quantify due to having many components.

Typically, performance of an infrastructure and/or one or more components of the infrastructure is measured using service level indicators (SLI) and service level objectives (SLO). Often, SLOs are combined into a service level agreement (SLA) which is an agreed upon level of service for a given infrastructure. Conventionally, an SLO is a target value or range of values for a service level (e.g., uptime of 99.995%, mean time to repair of 6 hours, latency of less than 500 ms) that is measured by a SLI (e.g., uptime, repair time, latency). Generally, a SLI is a defined quantitative measure of some aspect of a level of service that is provided by an infrastructure. Generally, when appropriate SLIs and SLOs are chosen they indicate an infrastructure's performance. However, mapping an infrastructure to appropriate SLIs and SLOs is a complex process, as often there are many components within each implementation of the infrastructure.

As described in various examples disclosed herein, to facilitate rapid deployment and improve system performance, the systems and methods disclosed herein advantageously monitors and analyze an infrastructure using service level objectives (SLOs), service level indicators (SLIs), and/or keywords to improve performance and/or improve analysis of the infrastructure. The SLOs, SLIs, and keywords may be used to find previously built and comparable implementations of infrastructures to determine additional metrics (e.g., SLIs and/or SLOs to better quantify performance) as well as provide optional components which may be used to increase performance (e.g., decrease response time, reduce latency, increase infrastructure availability, and/or reduce resource usage) of the infrastructure. In various implementations, instead of creating an entirely new infrastructure, prior implementations may be modified and/or at least a portion of one or more prior implementations may be reused to address current problems and/or performance issues of the infrastructure being built and/or deployed.

Figure 1:
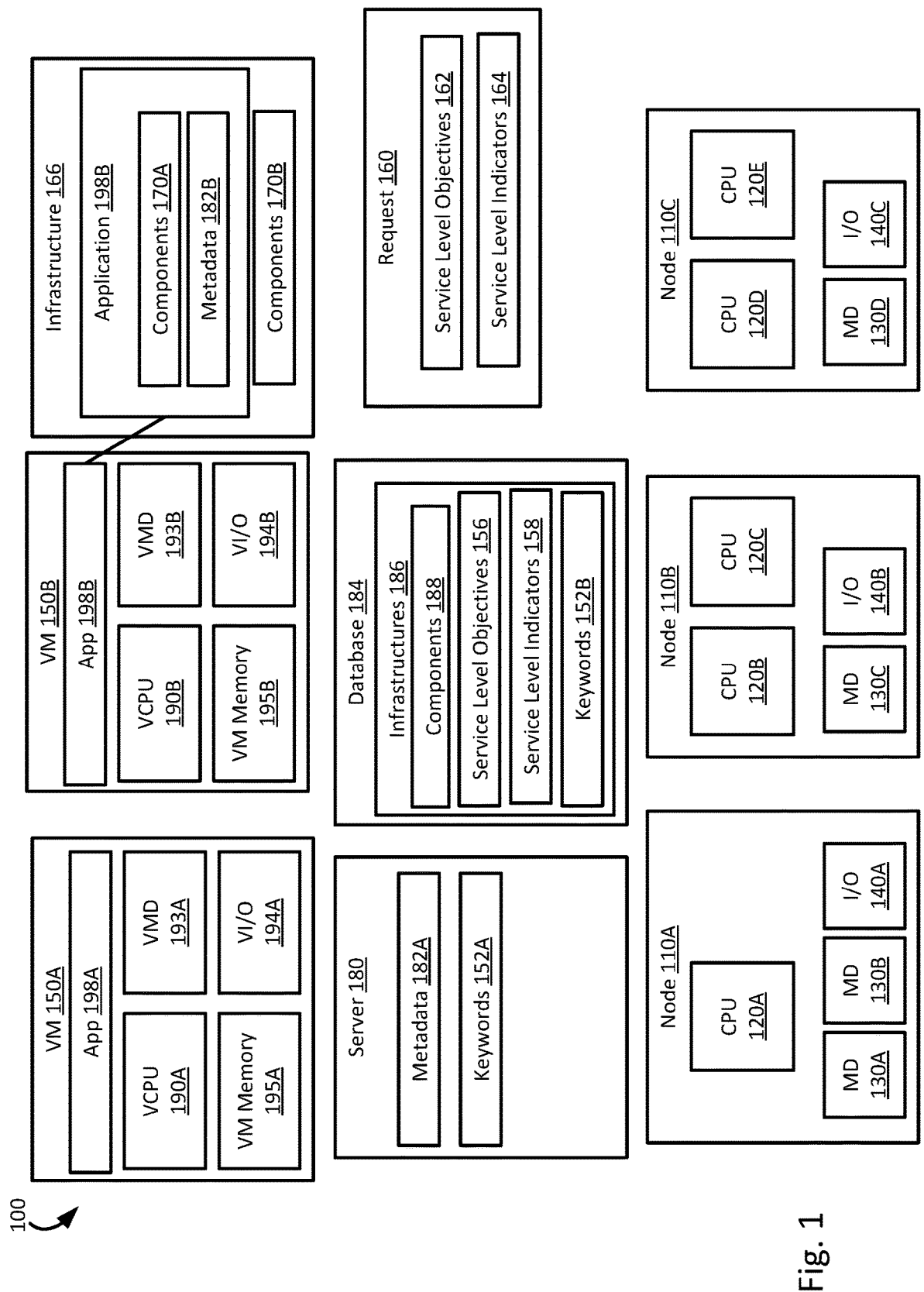
FIG. 1 illustrates a high level component diagram of an example computing system, in accordance with an embodiment of the present disclosure.

FIG. 1 depicts a high-level component diagram of an example computing system 100 in accordance with one or more aspects of the present disclosure. The computing system 100 may include a server 180, a database 184, one or more virtual machines (VM 150A-B, 150 generally), and nodes (e.g., nodes 110A-C, 110 generally). The system may have an infrastructure 166 installed and/or integrated within the system 100. In various implementations, an infrastructure 166 may include hardware and/or software resources (e.g., application 198, node 110, and/or VM 150). In some instances, an application (e.g., application 198B) may be called a component of the infrastructure 166. In various implementations, the system 100 may include metadata associated with the infrastructure 166 stored throughout the system 100. For example, server 180 may include metadata 182A (e.g., documentation and/or libraries associated with infrastructure 166). As shown in FIG. 1, Application 198B may include metadata 182B associated with either the application 198B or infrastructure 166 (e.g., metadata 182 may be source code, documentation, header files associated with either application 198B or infrastructure 166).

System 100 may include a database 184 comprised of various implementations of infrastructures 186. In some implementations, database 184 may be located on the server 180. In other implementations, database 184 may be located on one or more nodes (e.g., node 110A) and/or one or more virtual machines (e.g., VM 150A). As shown in FIG. 1, each of the infrastructures 186 may include components 188, service level objectives 156, service level indicators 158, and/or keywords associated with each of the infrastructures 186. For example, in one instance, infrastructures 186 may include multiple implementations of a delivery service tracking system (e.g., truck tracking and/or monitoring system, pizza deliver system, package delivery system) which may be associated with various SLIs 158, SLOs 156, and keywords 152B. The database may be searchable by SLI 158, SLO 156, and/or keyword 152B to find infrastructures associated with the search terms or developing infrastructures (e.g., infrastructure 166). In some implementations, a system 100 may receive requests 160, which include SLOs 162 and SLIs 16, which may be used to monitor and/or analyze an implementation of an infrastructure (e.g., infrastructure 166 or one of the infrastructures 186).

Virtual machines 150A-B may include a virtual machine memory (VM Memory), a virtual CPU (VCPU), virtual memory devices (VMD), and virtual input/output devices (VI/O). For example, virtual machine 150A may include virtual machine memory 195A, a virtual CPU 190A, a virtual memory devices 193A, and a virtual input/output device 194A. Similarly, virtual machine 150B may include virtual machine memory 195B, a virtual CPU 190B, a virtual memory devices 193B, and virtual input/output device 194B. In an example, Applications 198A-B may be different applications or services. In another example, applications 198A-B may be different instances of the same application or service.

In an example, a virtual machine 150A may execute a guest operating system and run applications 198A-B which may utilize the underlying VCPU 190A, VMD 193A, and VI/O device 194A. One or more applications 198A-B may be running on a virtual machine 150A under the respective guest operating system. A virtual machine (e.g., VM 150A-B, as illustrated in FIG. 1) may run on any type of dependent, independent, compatible, and/or incompatible applications on the underlying hardware and operating system ("OS"). In an example, applications (e.g., App 198A-B) run on a virtual machine 150A may be dependent on the underlying hardware and/or OS. In another example embodiment, applications 198A-B run on a virtual machine 170A may be independent of the underlying hardware and/or OS. For example, application 198A run on a first virtual machine 150A may be dependent on the underlying hardware and/or OS while application (e.g., application 198B) run on a second virtual machine (e.g., VM 150B) is independent of the underlying hardware and/or OS. Additionally, applications 198A-B run on a virtual machine 150A may be compatible with the underlying hardware and/or OS. In an example embodiment, applications 198A-B run on a virtual machine 150A may be incompatible with the underlying hardware and/or OS. For example, application 198A run on one virtual machine 150A may be compatible with the underlying hardware and/or OS while applications 198B run on another virtual machine 150B are incompatible with the underlying hardware and/or OS.

In an example, virtual machines 150A-B may instead be containers that execute applications or services, such as microservices. In an example, the containers may each run a process or service and the containers may be any execution environment. For example, the containers may be a virtual server. It should be appreciated that containers may be stand alone execution environments, similar to that of a virtual machine. The applications 198A-B or services (e.g., microservices) may run in a software container or a virtual machine (e.g., virtual machines 150A-B).

The computer system 100 may include one or more nodes 110A-C. Each node 110A-C may in turn include one or more physical processors (e.g., CPU 120A-E) communicatively coupled to memory devices (e.g., MD 130A-D) and input/output devices (e.g., I/O 140A-C). Each node 110A-C may be a computer, such as a physical machine and may include a device, such as hardware device. In an example, a hardware device may include a network device (e.g., a network adapter or any other component that connects a computer to a computer network), a peripheral component interconnect (PCI) device, storage devices, disk drives, sound or video adaptors, photo/video cameras, printer devices, keyboards, displays, etc. Virtual machines 150A-B may be provisioned on the same host or node (e.g., node 110A) or different nodes. For example, VM 150A and VM 150B may both be provisioned on node 110A. Alternatively, VM 150A may be provided on node 110A while VM 150B is provisioned on node 110B.

As used herein, physical processor or processor 120A-E refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-D refers to a volatile or non-volatile memory device, such as RAM, ROM, EEPROM, or any other device capable of storing data. As discussed herein, I/O device 140A-C refers to a device capable of providing an interface between one or more processor pins and an external device capable of inputting and/or outputting binary data.

Processors (e.g., CPUs 120A-E) may be interconnected using a variety of techniques, ranging from a point-to-point processor interconnect, to a system area network, such as an Ethernet-based network. Local connections within each node, including the connections between a processor 120A-E and a memory device 130A-D may be provided by one or more local buses of suitable architecture, for example, peripheral component interconnect (PCI).

Figure 2:
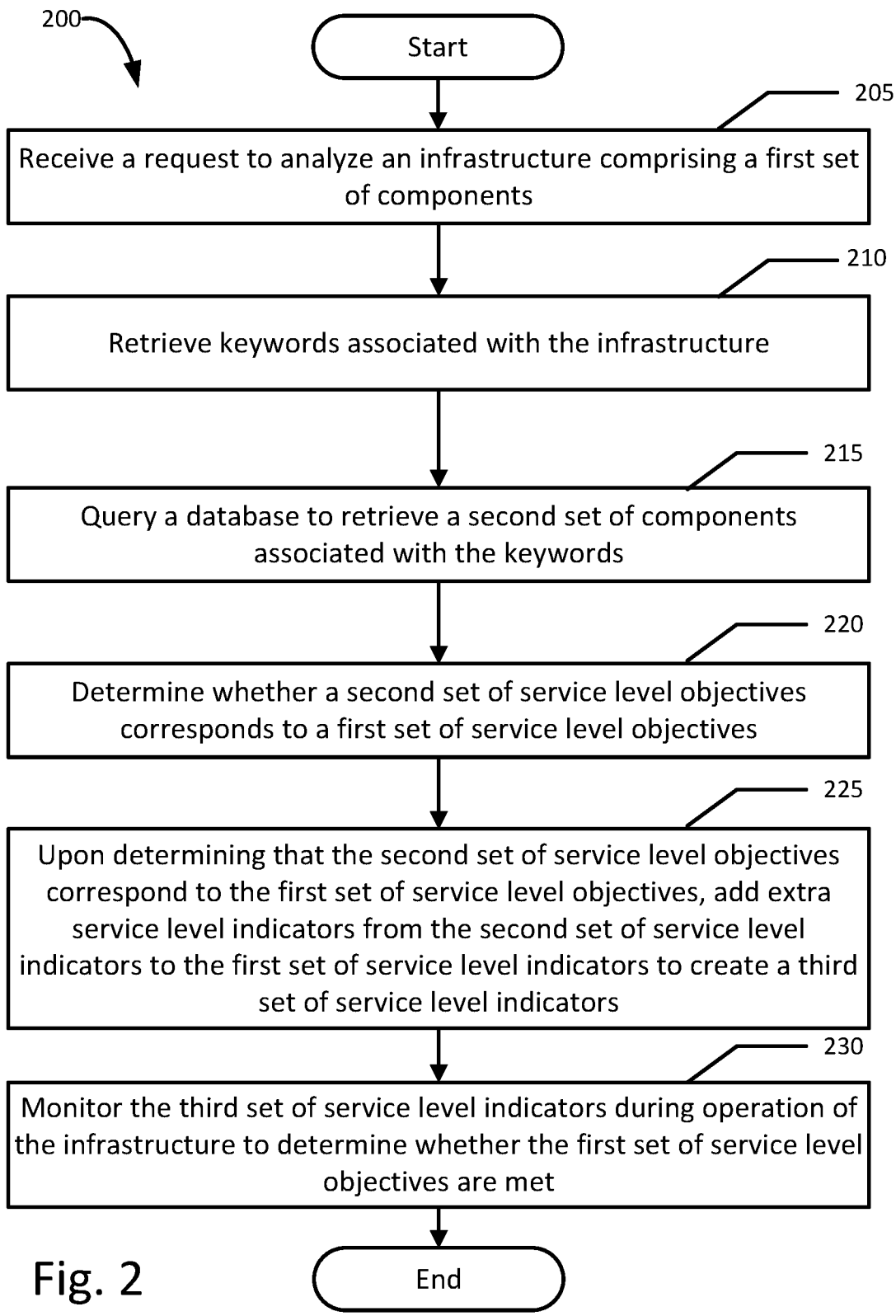
FIG. 2 illustrates a flowchart of an example method of monitoring an infrastructure, in accordance to an example embodiment of the present disclosure.

FIG. 2 illustrates a flowchart of an example method of monitoring an infrastructure, in accordance with an embodiment of the present disclosure. Although the example method 200 is described with reference to the flowchart illustrated in FIG. 2, it will be appreciated that many other methods of performing the acts associated with the method 200 may be used. For example, the order of some of the blocks may be changed, certain blocks may be combined with other blocks, blocks may be repeated and some of the blocks described are optional. The method 200 may be performed by processing logic that may comprise hardware (circuitry, dedicated logic, etc.), software, or a combination of both.

As shown in FIG. 2, an example method 200 may begin with receiving a request to analyze an infrastructure comprising a first set of components (block 205). The request may include a first set of service level indicators associated with the first set of components and a first sets of service level objectives associated with the infrastructure. For example, a system 100 may receive a request 160 to analyze an initial configuration for a truck tracking system (e.g., infrastructure 166). In this example, the request may include service level objectives 162 associated with performance goals of the proposed truck tracking system (e.g., goal of system up time of 99.9995%) and service level indicators 164 by which the performance goals are measured (e.g., actual availability of the system 100). Next, the example method 200 may include retrieving keywords associated with the infrastructure (block 210). For example, to categorize and/or associate the infrastructure 166 with prior implementations of infrastructures 186, the system 100 may compare SLOs 162 with SLOs 156, SLIs 164 with SLIs 158, and/or keywords 152A with keywords 152B (e.g., a system may associate a package delivery service and taxi service because both services involve "vehicles", "route", and "location"). A system 100 may retrieve metadata 182A and 182B (e.g., source code, documentation, libraries, header files, and other sources of information about the infrastructure 166) associated with the infrastructure 166 and analyze the metadata 182A and 182B to retrieve keywords 152A (e.g., keywords for an online store may include shopping cart, wish list, membership, search requirements).

Next, the example method 200 may include querying a database to retrieve a second set of components associated with the keywords (block 215). The database includes one or more implementations of infrastructures where each implementation includes one or more components from which the second set of components are retrieved. The second set of components is associated with a second set of service level indicators and a second set of service level objectives. For example, a database 184 may include previous implementations of various infrastructures 186 (e.g., pizza delivery system, implementation of hardware and software associated with supporting virtual machines, truck delivery tracking system). Each of the infrastructures 186 includes one or more components 188, SLOs 156, SLIs 158, and keywords 152B. Each of the infrastructures 186 may be searchable by component 188, SLO, 156, SLI, 158, or keyword 152B. Infrastructures (e.g., infrastructures 166 and 186) with similar components 188, SLOs, 156, SLIs, 158, or keywords 152B may include interchangeable components and/or solutions for similar problems (e.g., software and hardware used for tracking package delivery trucks may be useful tracking pizza delivery vehicles). In some instances, one infrastructure from infrastructures 186 may include additional SLIs (e.g., SLI 158) which may be useful in determining whether a SLO (e.g., SLO 162) for a similar infrastructure (e.g., infrastructure 166) has been achieved. Next, the method 200 may include determining whether a second set of service level objectives corresponds to a first set of service level objectives (block 220). For example, key indicators of whether two infrastructures solve similar problems include whether they have similar keywords, SLIs, and/or SLOs (e.g., service up-time, error rate, hardware failure rate).

Next, the method 200 may include upon determining that the second set of service level objectives correspond to the first set of service level objectives, adding extra service level indicators from the second set of service level indicators to the first set of service level indicators to create a third set of service level indicators (block 225). SLOs 162, SLIs 164, and keywords, 152A associated with infrastructure 166 may be used to find other infrastructures (e.g., infrastructure 186)

with similar SLOs 156, SLIs 158, and/or keywords 152B that may have similar functionality. For example, while two different implementations may not be directly related (e.g., cloud storage versus a call center), there are commonalities in SLOs and SLIs (e.g., network uptime, availability, and mean time to recovery) which may be used to analyze both implementations. Next, the method 200 may include monitoring the third set of service level indicators during operation of the infrastructure to determine whether the first set of service level objectives are met (block 230). Once the SLI's associated with the infrastructure 166 are determined, the system 100 may monitor the infrastructure 166 while operational. For example, in some implementations, one or more agents may be used to monitor SLIs within an infrastructure. In other implementations, each component may output one or more SLIs to text files, output files, and/or output each SLI to a monitoring database. In various implementations, if an infrastructure does not meet specified SLOs, a system may output an alert and/or flag the system in an error log. In certain implementations, a system may output optional replacement components for an infrastructure 166 to improve performance of the infrastructure 166.

Figure 3:
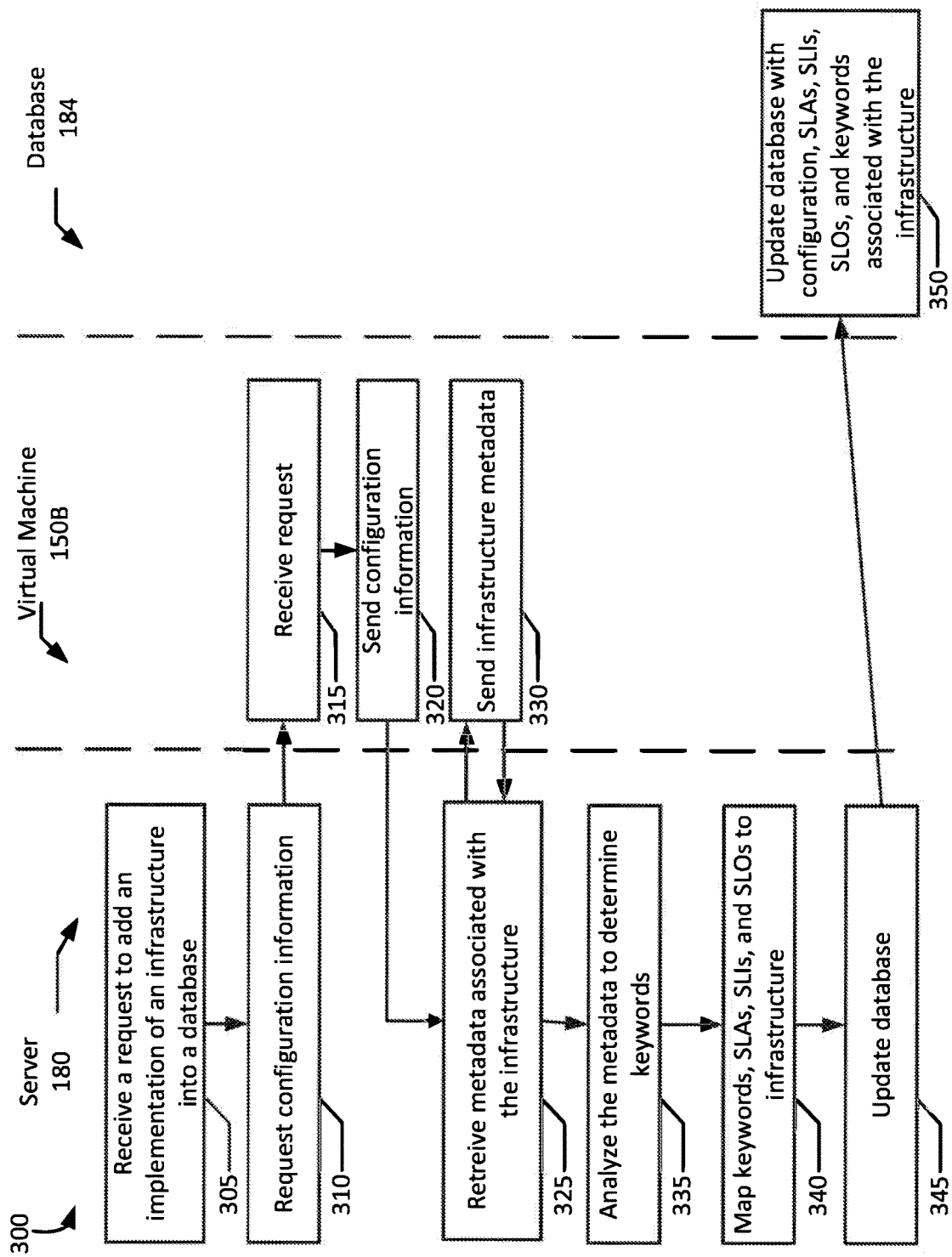
FIG. 3 illustrates a flow diagram of example methods of building a database of implementations of infrastructures, in accordance with an embodiment of the present disclosure.

FIG. 3 illustrates a flow diagram of an example methods of building a database of implementations of infrastructures, in accordance with an embodiment of the present disclosure. Although the example method 300 is described with reference to the flow diagram illustrated in FIG. 3, it will be appreciated that many other methods of performing the acts associated with the method 300 may be used. For example, the order of some of the blocks may be changed, certain blocks may be combined with other blocks, blocks may be repeated, and some of the blocks described are optional. For example, in the illustrated flow diagram, a server 180 is in communication with a virtual machine 150B and a database 184 to incorporate an implementation of an infrastructure 166 into the database 184.

As shown in FIG. 3, Server 180 receives a request 160 to add an implementation of an infrastructure 166 into a database 184 (block 304). For example, infrastructure 166 may be an implementation of a package tracking system for a delivery service to be added to the database 184. The Server 180 requests configuration information from virtual machine 150B (block 310). For example, configuration information for a package tracking system may include a type of delivery trucks, a type of tracking hardware, and/or other components included in infrastructure 166. The virtual machine 150B receives the request (block 315) and sends the configuration information to the server 180 (block 320). Server 180 then retrieves metadata 182B associated with the infrastructure 166 from virtual machine 150B (block 325). The virtual machine 150B sends the metadata 182B in response to the requests (block 330). For example, metadata 182B may include documentation, source code, header files, APIs, libraries, and/or other files associated with the infrastructure 166. The server 180 analyzes the metadata 182B to determine keywords 152A associated with the infrastructure 166 (block 335). For example, in one implementation, a server 180 may parse the metadata 182B into individual words and analyze the individual words with a model (e.g., bag of words model). In various implementations, a model may indicate a frequency and/or significance of one or more words with respect to the system.

The server 180 maps the keywords 152A, service level agreements (SLA), SLOs 162, and SLIs 164 to the infrastructure 166 (block 340) and updates the database (block 345). Next, the database 184 is updated with a mapping of configuration information, SLAs, SLIs 164, SLOs 162, and keywords 152A to the infrastructure 166 (block 350). For example, when mapped, a tracking system infrastructure may be searchable by SLA, SLO, SLI, or keywords associated with the infrastructure (e.g., infrastructure 166).

Figure 4:
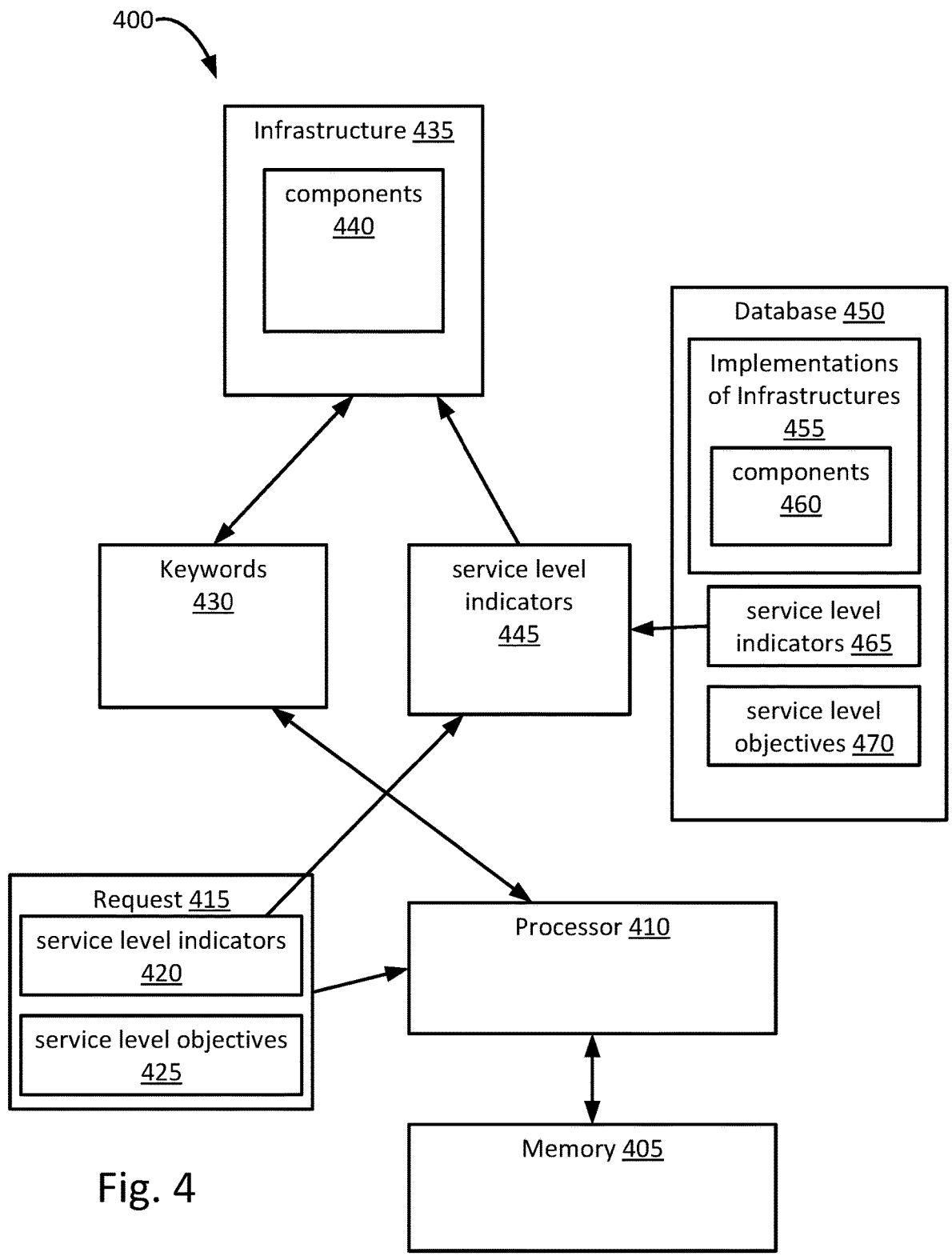
FIG. 4 illustrates a block diagram of an example system for monitoring infrastructure, in accordance with an example embodiment of the present disclosure.

FIG. 4 is a block diagram of system 400 which includes memory 405 and processor 410. The processor 410 is in communication with the memory 405. The processor 410 is configured to receive a request 415 to analyze an infrastructure 435 comprising a first set of components 4440, where the request 415 includes a first set of service level indicators 420 and associated with the first set of components 440 and a first set of service level objectives 425 associated with the infrastructure 435. Keywords 430 associated with the infrastructure 435 are retrieved and a database 450 is queried to retrieve a second set of components 460 associated with the keywords 430. The database 450 comprises implementations of infrastructures 455 where each implementation is comprised of one or more components 460, where the second set of components 460 are associated with a second set of service level indicators 465 and a second set of service level objectives 470. The processor 410 is configured to determine whether the second set of service level objectives 470 corresponds to the first set of service level objectives 425 and, upon determining that the second set of service level objectives 470 corresponds to the first set of service level objectives 425, add extra service level indicators 465 from the second set of service level indicators 465 to the first set of service level indicators 420 to create a third set of service level indicators 445. Next, the third set of service level indicators 445 are monitored during operation of the infrastructure 435 to determine whether the first set of service level objectives 425 are met.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. A system, comprising:
    a memory; and
    a processor in communication with the memory, wherein the processor is configured to:
        receive a request to analyze an infrastructure comprising a first set of components, wherein the request includes a first set of service level indicators associated with the first set of components, wherein a service level indicator is a defined quantitative measure of some aspect of a level of service that is provided by an infrastructure, and a first set of service level objectives associated with the infrastructure;
retrieve keywords associated with the infrastructure;
automatically query a database, which comprises data associated with implementations of infrastructures, to retrieve data associated with a second set of components of a second infrastructure which are associated with the keywords, wherein each implementation is a previously built infrastructure comprised of one or more components, wherein the data associated with the second set of components includes a second set of service level indicators and a second set of service level objectives;
determine whether the second set of service level objectives correspond to the first set of service level objectives;
upon the determining that the second set of service level objectives correspond to the first set of service level objectives, add extra service level indicators from the second set of service level indicators to the first set of service level indicators to create a third set of service level indicators, wherein the extra service level indicators are additional service level indicators based on which a determination is made in order to determine whether the first set of service level objectives are being met;
monitor the third set of service level indicators during operation of the infrastructure to determine whether the first set of service level objectives are met;
determine, during operation of the infrastructure, at least one service level indicator of the third set of service level indicators that fails to meet at least one service level objective of the first set of service level objectives; and
upon the determining that the at least one service level indicator of the third set of service level indicators fails to meet the at least one service level objective of the first set of service level objectives, determine at least one replacement component for the infrastructure and modify the infrastructure using the at least one replacement component.

2. The system of claim 1, wherein the processor is further configured to: upon the determining that the at least one service level indicator of the third set of service level indicators fails to meet the at least one service level objective of the first set of service level objectives, output an alert that the first set of components fail to meet the first set of service level objectives.

3. The system of claim 1, wherein the retrieving keywords associated with the infrastructure comprises:
retrieving metadata associated with the infrastructure; and
analyzing the metadata to retrieve keywords associated with the infrastructure.

4. The system of claim 3, wherein the metadata comprises source code associated with the first set of components.

5. The system of claim 3, wherein the metadata comprises documentation associated with the first set of components.

6. The system of claim 3, wherein the metadata comprises libraries associated with the first set of components.

7. The system of claim 1, wherein the processor is further configured to:
add the infrastructure to the database, wherein the database is also updated with a mapping of configuration information, service level agreements, the third set of service level indicators, the first set of service level objectives, and the keywords associated with the infrastructure.

8. A method, comprising:
receiving a request to analyze an infrastructure comprising a first set of components, wherein the request includes a first set of service level indicators associated with the first set of components, wherein a service level indicator is a defined quantitative measure of some aspect of a level of service that is provided by an infrastructure, and a first set of service level objectives associated with the infrastructure;
retrieving keywords associated with the infrastructure;
automatically querying a database, which comprises data associated with implementations of infrastructures, to retrieve data associated with a second set of components of a second infrastructure which are associated with the keywords, wherein each implementation is a previously built infrastructure comprised of one or more components, wherein the data associated with the second set of components includes a second set of service level indicators and a second set of service level objectives;
determining whether the second set of service level objectives correspond to the first set of service level objectives;
upon the determining that the second set of service level objectives correspond to the first set of service level objectives, adding extra service level indicators from the second set of service level indicators to the first set of service level indicators to create a third set of service level indicators, wherein the extra service level indicators are additional service level indicators based on which a determination is made to determine whether the first set of service level objectives are being met;
monitoring the third set of service level indicators during operation of the infrastructure to determine whether the first set of service level objectives are met;
determining, during operation of the infrastructure, at least one service level indicator of the third set of service level indicators that fails to meet at least one service level objective of the first set of service level objectives; and
upon the determining that the at least one service level indicator of the third set of service level indicators fails to meet the at least one service level objective of the first set of service level objectives, determining at least one replacement component for the infrastructure and modifying the infrastructure using the at least one replacement component.

9. The method of claim 8, further comprising:
upon the determining that the at least one service level indicator of the third set of service level indicators fails to meet the at least one service level objective of the first set of service level objectives, outputting an alert that the first set of components fail to meet the first set of service level objectives.

10. The method of claim 8, wherein the retrieving keywords associated with the infrastructure comprises:
retrieving metadata associated with the infrastructure; and
analyzing the metadata to retrieve keywords associated with the infrastructure.

11. The method of claim 10, wherein the metadata comprises source code associated with the first set of components.

12. The method of claim 10, wherein the metadata comprises documentation associated with the first set of components.

13. The method of claim 10, wherein the metadata comprises libraries associated with the first set of components.

14. The method of claim 8, wherein at least one of the first set of components comprises an application.

15. A non-transitory machine readable medium storing code, which when executed by a processor is configured to:

receive a request to analyze an infrastructure comprising a first set of components, wherein the request includes a first set of service level indicators associated with the first set of components, wherein a service level indicator is a defined quantitative measure of some aspect of a level of service that is provided by an infrastructure, and a first set of service level objectives associated with the infrastructure;

retrieve keywords associated with the infrastructure;

automatically query a database, which comprises data associated with implementations of infrastructures, to retrieve data associated with a second set of components of a second infrastructure which are associated with the keywords, wherein each implementation is a previously built infrastructure comprised of one or more components, wherein the data associated with the second set of components includes a second set of service level indicators and a second set of service level objectives;

determine whether the second set of service level objectives correspond to the first set of service level objectives;

upon the determining that the second set of service level objectives correspond to the first set of service level objectives, add extra service level indicators from the second set of service level indicators to the first set of service level indicators to create a third set of service level indicators, wherein the extra service level indicators are additional service level indicators based on which a determination is made to determine whether the first set of service level objectives are being met;

monitor the third set of service level indicators during operation of the infrastructure to determine whether the first set of service level objectives are met;

determine, during operation of the infrastructure, at least one service level indicator of the third set of service level indicators that fails to meet at least one service level objective of the first set of service level objectives; and upon the determining that the at least one service level indicator of the third set of service level indicators fails to meet the at least one service level objective of the first set of service level objectives, determine at least one replacement component for the infrastructure and modify the infrastructure using the at least one replacement component.

* * * * *